Sept. 11, 1956
J. C. BREGAR
2,762,975
DIFFERENTIAL VOLTMETERS
Filed Aug. 2, 1952
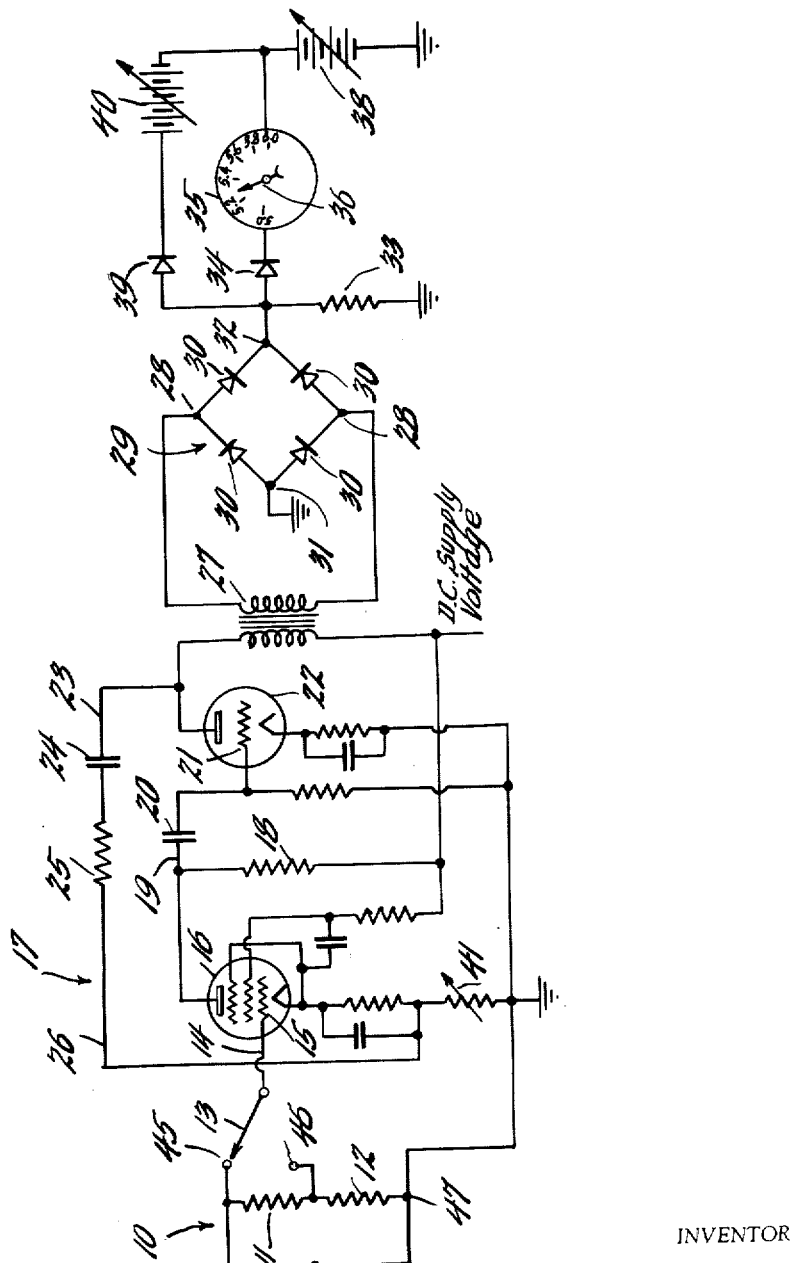
INVENTOR
*Joseph C. Bregar,*
BY *C. B. Hamilton.*
ATTORNEY United States Patent Office 2,762,975
Patented Sept. 11, 1956

2,762,975

DIFFERENTIAL VOLTMETERS

Joseph C. Bregar, Winston-Salem, N. C., assignor to Western Electric Company, Incorporated, New York, N. Y., a corporation of New York Application August 2, 1952, Serial No. 302,402

4 Claims. (Cl. 324—123)

This invention relates to differential voltmeters, and more particularly to a differential voltmeter having a linear expanded scale with means for the calibration thereof and means for protecting it from overvoltage and undervoltage.

The majority of the prior differential voltmeters have been simple bias types or mechanical in action and thus limited in their scope and operation. In the ordinary type of voltmeter, accurate measurement of small changes in large voltages is impossible because these changes do not result in discernable deflections of the indicating pointer. The need arises, therefore, for an instrument whereby changes in voltage relative to a given reference level are measured with high accuracy. Moreover, the instrument must be insensitive to power supply voltage variations, independent of the input frequency, and the differential scale must be easily calibrated.

An object of this invention is to provide a voltmeter having a linear response scale for the differential range thereof.

Another object of this invention is to provide protection for the meter for inputs less than the minimum indication for the differential range.

A still further object of this invention is to provide meter protection from values of voltage that are greater than the maximum indication for the differential range.

A still further object of this invention is to provide means for calibrating the differential scale of the voltmeter.

With these and other objects in view, the invention comprises a voltage divider network for receiving a signal to be measured, means for directing all or a predetermined fraction of the voltage impressed on the network to a two-stage high-gain feedback amplifier, and a rectifying bridge coupled to said amplifier and having its output connected to a load resistor which is paralleled by two circuits, the first parallel circuit comprising a meter, a variable reference voltage and a rectifying means connected in series, and the second parallel circuit comprising a second rectifying means and a variable voltage source in series.

A complete understanding of the invention may be obtained from the following detailed description taken in conjunction with the accompanying drawing in which the single figure discloses a circuit diagram of a differential voltmeter embodying the invention.

Referring now to the drawing, a voltage to be measured is applied across a voltage dividing network 10 comprising resistors 11 and 12 connected in series and a selector switch 13 which is connected through a conductor 14 to a control grid 15 of a high-gain pentode tube 16, the pentode being the first stage of a two-stage high-gain feedback amplifier designated generally as 17. The switch 13 permits the application of all or a predetermined part of the input voltage to the grid 15. The output voltage of the tube 16 is impressed across a resistor 18 connected in parallel therewith, and is then directed through a conductor 19 and a capacitor 20 to a control grid 21 of a vacuum tube 22 of the amplifier 17. A portion of the output voltage from this tube 22 is returned to the tube 16 of the first stage through a conductor 23, a capacitor 24, a resistor 25, and a conductor 26, the values of the components 24 and 25 being selected to provide a degenerative feedback voltage across a variable resistance 41. The output of the tube 22 is coupled through an iron-cored transformer 27 to input terminals 28 of a varistor bridge 29 which has individual cuprous oxide rectifiers 30 connected in the usual full-wave rectifying bridge circuit. An output terminal 31 of the rectifying bridge 29 is grounded, the other output terminal 32 being connected to ground through a load resistor 33. The output terminal 32 is also connected to a rectifier 34 which is series connected to a sensitive microammeter 35 having a linear scale 36. The other terminal of the microammeter is connected to an adjustable reference voltage source 38. The series connected varistor 34 and meter 35 are parallelled by a series combination of a rectifier 39 and an adjustable voltage source 40.

In operation, the amplifier 17, rectifier 29, and meter 35 are first calibrated by applying a signal of known strength to the input terminals of the voltage divider network 10. The selector switch 13 is then connected to a contact 45 thereof to apply a full known voltage that is equal to the full scale value. Next, the selector switch 13 is connected to a contact 46 of the voltage divider network 10 to apply a predetermined fraction of the signal voltage to the grid 15 of the tube 16. If the meter 35 is correctly calibrated, the meter indication will drop to the lowest value marked on its scale 36. If it is not correctly calibrated, the variable reference voltage source 38 is adjusted and the gain of the amplifier is altered by varying the resistance 41 until a subsequent operation of the switch 13 gives the desired result of bringing the meter to the lowest value marked on its scale 36. The switch 13 is then connected to the contact 45 during measurement.

After the voltmeter has been calibrated, the signal to be measured is applied across the voltage divider 10 and is amplified by the two-stage feedback amplifier 17. The signal is then rectified by the bridge 29 and this rectified signal is applied across the load resistor 33. The meter 35, the rectifier 34 and the variable reference voltage 38 are connected in series and this series combination is connected in parallel with the load resistor 33. The reading of the meter 35 as indicated by its scale 36 will therefore be the difference of the load voltage and the reference voltage and hence an increase in the signal voltage will produce a corresponding increase in the indicated value of voltage thereby providing a linear response and making a linear scale possible.

The voltmeter may also be used for adjusting a known voltage a differential amount. The switch 13 is set at the contact 45 and the resistor 41 is varied to adjust the amplifier gain and the voltage source 38 is adjusted for a midscale deflection. The switch 13 is then set at the contact 46 and the input voltage is increased until the same meter deflection as previously noted is indicated on the scale. Thus the input voltage is varied by a known increment. The resistors 11 and 12 can be selected for any desired proportional relation.

Meter 35 is protected against an overvoltage by the rectifier 39 and the source of potential 40. If a value of voltage greater than the sum of the reference voltage 38 and the potential of voltage source 40 is applied to the load resistor 33, the rectifier 39 becomes conductive and provides a parallel path around meter 35 to bypass the excess current around the meter to protect its sensitive coil elements.

Meter 35 is protected from damage by the reference voltage in the absence of an incoming signal by the series-connected rectifier 34. When the value of reference voltage 38 exceeds the value of an incoming signal, rectifier 34 is non-conductive and thus prevents the flow of current through the meter thereby protecting the meter 35 from values of incoming voltage less than the reference voltage.

It is to be understood that the above-described arrangement is simply illustrative of the application of the principles of the invention. Numerous other arrangements may be readily devised by those skilled in the art without departing from the spirit and scope of the invention.

What is claimed is:

1. In a differential voltage measuring system a voltage divider, a two stage degenerative feedback amplifier, means connecting said voltage divider to said amplifier, means to control the amount of degenerative feedback of said amplifier so that the gain thereof may be varied, full-wave rectifying means, means coupling said amplifier to said full-wave rectifying means, a load resistor connected to the output of said full-wave rectifying means, a source of variable reference voltage having one terminal thereof connected to one terminal of said load resistor, an ammeter, means connecting said ammeter between the other terminal of said load resistor and the other terminal of said source of variable reference voltage so that said ammeter is responsive to the differential voltage between said other terminals, said ammeter connecting means including second rectifying means connected between said other load resistor terminal and said ammeter, said second rectifying means being unilaterally conductive in a path from said other load resistor terminal to said other terminal of the source of variable reference voltage to protect the ammeter from values of reference voltage that are higher than the voltage to be measured, third rectifying means, and a second adjustable voltage source, said third rectifying means and said second adjustable voltage source constituting a series circuit and connected between said other load resistor terminal and said other terminal of said source of variable reference voltage, said third rectifying means being unilaterally conductive in a path similar to that of said second rectifying means to protect the ammeter from values of voltages to be measured that are higher than the value of reference voltage.

2. A differential voltage measuring system comprising an intermediate-tapped resistor to receive a voltage to be measured, a first amplifying stage, switching means connecting said tapped resistor to said first amplifying stage so that the percentage of the voltage to be measured that is applied to the first amplifying stage may be varied, the first amplifying stage including a variable resistor in its cathode circuit, a second amplifying stage, means coupling said first amplifying stage to said second amplifying stage, means for feeding back a portion of the output voltage of said second stage to said variable resistor in the cathode circuit of the first amplifying stage so that the gain of the coupled amplifying stages may be varied, a full-wave rectifier, means connecting said second amplifying stage to said full-wave rectifier, a load resistor connected across said full-wave rectifier, a source of variable reference voltage having one terminal connected to one terminal of said load resistor, an ammeter, a first rectifying means connected in series with said ammeter to protect said ammeter against values of reference voltage that are larger than the voltage to be measured, the series combination of said ammeter and said first rectifying means being connected between said other terminal of the load resistor and said other terminal of the source of variable reference voltage, a second rectifying means, and a source of potential, said source of potential and said rectifying means being connected in series, the series combination thereof being connected in parallel with the series combination of the said ammeter and the said rectifying means to protect it against values of voltages to be measured that produce currents that exceed the capacity of the ammeter.

3. A differential voltage measuring system comprising a voltage divider having a plurality of taps and adapted to receive the incoming signal; an amplifier, means connecting said amplifier to said taps of said voltage divider so that the percentage of incoming signal that is applied to said amplifier can be varied; means for varying the gain of said amplifier so that the differential voltage measuring system may be calibrated; rectifying means; means coupling said amplifier to said rectifying means; current responsive means; a source of reference voltage; said current responsive means and said source of reference voltage being connected in series, means coupling the series combination thereof to said rectifying means so that said current responsive means indicates the potential difference between the voltage across the rectifying means and the source of reference voltage; said coupling means including a second rectifying means for preventing damage to the current responsive means when the reference voltage exceeds the voltage across the first rectifying means; said second rectifying means also being in series with said current responsive means; means for varying the reference voltage so that the reference voltage may be adjusted to the same order of magnitude as the voltage across said rectifying means; a third rectifying means; and a source of potential, said third rectifying means and said source of potential being connected in series, the series combination thereof being connected in parallel with the series combination of said second rectifying means and said current responsive means to protect it against currents exceeding its capacity.

4. A differential voltage measuring system comprising a resistor tapped at a predetermined intermediate point and adapted to receive a voltage to be measured; a first vacuum tube including an anode, a cathode and a control grid; a single-pole double-throw switch having two blade terminals and a center post, the first blade terminal of said switch being connected to an end terminal of said resistor, the second blade terminal of said switch being connected to the intermediate tap of said resistor, and the center post of said switch being connected to the control grid of said first vacuum tube so that the amount of the voltage to be measured that is impressed on said control grid may be varied by a predetermined amount; a second vacuum tube; means coupling the output of said first vacuum tube to said second vacuum tube; a variable resistor in the cathode circuit of said first vacuum tube; means for degeneratively feeding back a portion of the output voltage of said second vacuum tube to said variable resistor in the cathode circuit of said first vacuum tube so that the gain of the coupled vacuum tubes is adjustable; a full-wave rectifying bridge; a second coupling means for coupling the output of said second vacuum tube to the input of said full-wave rectifying bridge; a load resistor connected across the output terminal of said bridge; a source of direct current reference voltage having one terminal connected to one output terminal of said bridge, said source of reference voltage being variable so that the reference voltage may be adjusted to the same order of magnitude as the amplified voltage to be measured; a D. C. microammeter connected between the other terminal of said source of reference voltage and the other output terminal of said rectifying bridge for measuring the voltage difference between said reference voltage and the voltage to be measured; rectifying means connected in series with said microammeter to protect it against voltages to be measured that are less than the reference voltage; a second rectifying means; and a source of voltage; said second rectifying means and said source of voltage being connected in series, the series combination thereof being connected in parallel with the said series combination of said rectifier and said microammeter to protect said microammeter against values of the voltage to be measured that exceed the capacity of the microammeter.

References Cited in the file of this patent

UNITED STATES PATENTS

| | | |
|---|---|---|
| 1,363,267 | Porter | Dec. 28, 1920 |
| 1,622,786 | Horle | Mar. 29, 1927 |
| 1,836,934 | Morecroft | Dec. 15, 1931 |
| 2,079,485 | Bousman | May 4, 1937 |
| 2,104,211 | Soller | Jan. 4, 1938 |
| 2,147,729 | Wurmser | Feb. 21, 1939 |
| 2,323,762 | George | July 6, 1943 |
| 2,545,547 | Gates | Mar. 20, 1951 |
| 2,571,458 | Lawrence | Oct. 16, 1951 |
| 2,584,800 | Grisdale | Feb. 5, 1952 |
| 2,600,423 | Nolle | June 17, 1952 |

FOREIGN PATENTS

| | | |
|---|---|---|
| 472,771 | Germany | Mar. 5, 1929 |
| 656,056 | Great Britain | Aug. 8, 1951 |

OTHER REFERENCES

Lawrence et al., Abstract No. 650,370, published in O. G., June 27, 1950.

UNITED STATES PATENT OFFICE

CERTIFICATE OF CORRECTION

Patent No. 2,762,975 September 11, 1956

Joseph C. Bregar

It is hereby certified that error appears in the printed specification of the above numbered patent requiring correction and that the said Letters Patent should read as corrected below.

Column 4, line 4, before "rectifying" insert --first--.

Signed and sealed this 17th day of December 1957.

(SEAL)
Attest:

KARL H. AXLINE
Attesting Officer

ROBERT C. WATSON
Commissioner of Patents